Figure 1:
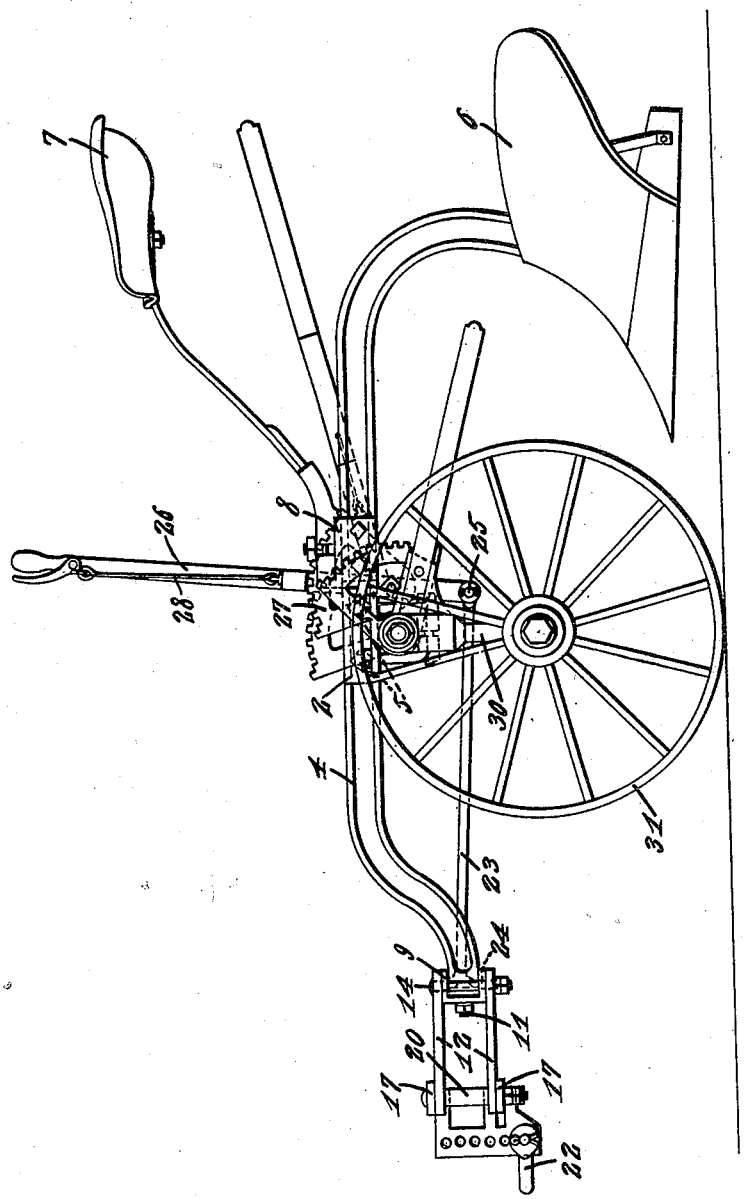

Dec. 9, 1924.

F. H. RAAZ

DRAFT RIGGING

Filed Feb. 4, 1924

1,518,452

2 Sheets-Sheet 1

F. H. Raaz, Inventor

By C. A. Snow & Co.
Attorneys

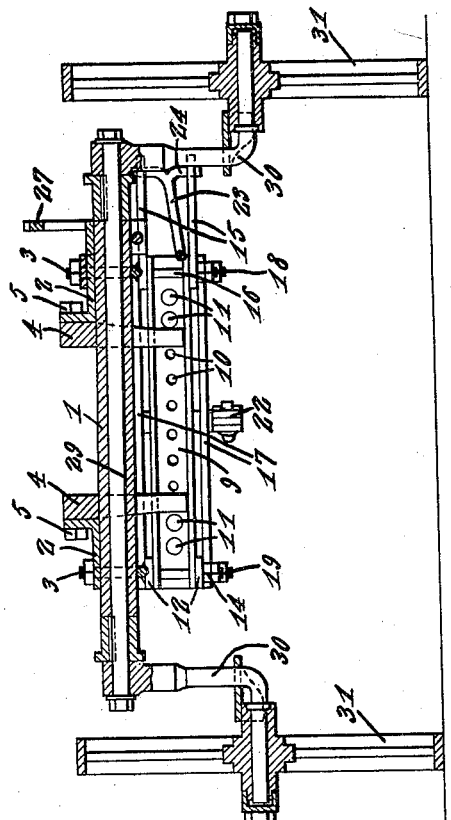

Patented Dec. 9, 1924.

1,518,452

UNITED STATES PATENT OFFICE.

FRANK H. RAAZ, OF EL CAMPO, TEXAS.

DRAFT RIGGING.

Application filed February 4, 1924. Serial No. 690,493.

*To all whom it may concern:*

Be it known that I, FRANK H. RAAZ, a citizen of the United States, residing at El Campo, in the county of Wharton and State of Texas, have invented a new and useful Draft Rigging, of which the following is a specification.

It is the object of this invention to provide novel means whereby a draft hitch may be adjusted with respect to the draft line.

In the drawings:—

Figure 1 shows in side elevation a device constructed in accordance with the invention; Figure 2 is a cross section wherein parts appear in elevation; and Figure 3 is a top plan wherein parts are broken away.

In carrying out the invention, there is provided a main bar or support, which is rectangular in cross section. Angle brackets 2 are superposed on the bar 1 and are connected thereto by U-bolts 3. Beams 4 extend across the angle brackets 2 and are secured at 5 to the upstanding flanges of the angle brackets. The beams 4 carry plow shares 6. A seat 7 is supported at 8 on the beams 4. The numeral 9 marks a head bar having openings 10, adapted to receive securing elements 11 whereby the forward ends of the beams 4 are connected to the head bar.

The rear ends of links 12 are pivoted at 14 to the head bar 9 at one end of the head bar. Bell crank levers 15 are fulcrumed at 16 upon the other end of the head bar 9. Draft bars 17 are located in advance of the head bar 9. The forward ends of the bell crank levers 15 are pivoted at 18 to the draft bars 17. The forward ends of the links 12 are pivoted at 19 to the draft bars 17. The superposed bell crank levers 15 are held apart, and the superposed links 12 are held apart by spacers 20 mounted on the pivot members 18 and 19. The draft bars 17 have openings 21 in which a draft hitch 22 may be mounted for adjustment transversely of the vehicle.

The numeral 23 designates a connecting rod provided at its forward end with forks 24 pivoted in the ends of the outstanding arms of the bell crank levers 15. The rear end of the connecting rod is pivoted at 25 to the lower end of a lever 26 fulcrumed intermediate its ends on a segment 27 secured by one of the U-bolts 3 on one of the angle brackets 2. The lever 26 carries a latch mechanism 28 adapted to cooperate with the segment 27, and both the lever 26 and the latch mechanism 28 are accessible from the drivers seat 7.

An axle 29 passes through the support or bar 1 and is provided with hangers 30, ground wheels 31 being mounted to rotate upon the hangers.

The lever 26 may be swung backwardly and forwardly and, thus motion is imparted to the bell crank levers 15 through the instrumentality of the connecting rod 23. When the bell crank levers 15 are swung on their fulcrum 16, the draft bars 17 are moved laterally and horizontally, the draft hitch 22 being moved likewise, it being possible in this way to adjust the position of the draft hitch with respect to the draft line. During the lateral adjustment of the draft bars 17, as aforesaid, the links 12 pivot at 19 on the draft bars, and at 14 on the head bar.

Having thus described the invention, what I claim as new is:—

In a device of the class described, a wheel-mounted frame, a beam carried by the frame, a head bar carried by the beam, a draft bar located in advance of the head bar, a lever fulcrumed on the head and pivoted to the draft bar, a link pivoted to the head bar, a lever under the control of an operator and fulcrumed on the frame, and a connection pivoted at its ends to the levers.

In testimony that I claim the foregoing as my own, I have hereto affixed my signature in the presence of two witnesses.

FRANK H. RAAZ.

Witnesses:
H. V. REEVES,
MACK WEBB.